United States Patent
Nishiyama et al.

(10) Patent No.: US 11,584,197 B2
(45) Date of Patent: Feb. 21, 2023

(54) AIR-CONDITIONER CONTROL SYSTEM RESPONSIVE TO AN ELECTRONIC SETTLEMENT, AND COMPUTER-READABLE STORAGE MEDIUM THAT STORES THEREIN AIR-CONDITIONING CONTROL PROGRAM RESPONSIVE TO AN ELECTRONIC SETTLEMENT

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP); Erina Kigoshi, Tokyo-to (JP); Aiko Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 17/201,601

(22) Filed: Mar. 15, 2021

(65) Prior Publication Data
US 2021/0291631 A1 Sep. 23, 2021

(30) Foreign Application Priority Data
Mar. 19, 2020 (JP) .............................. JP2020-048921

(51) Int. Cl.
*B60H 3/00* (2006.01)

(52) U.S. Cl.
CPC ......... *B60H 3/0035* (2013.01); *B60H 3/0028* (2013.01)

(58) Field of Classification Search
CPC ............... B60H 3/0028; B60H 3/0035; B60H 1/00735; B60H 1/00014; F24F 2011/0002; F24F 1/0035; F24F 2120/00; F24F 2120/10; F24F 2120/12; F24F 2120/14; F24F 2120/20; G06Q 30/00
See application file for complete search history.

(56) References Cited

U.S. PATENT DOCUMENTS

| | | | |
|---|---|---|---|
| 2013/0085609 A1* | 4/2013 | Barker ................... | H04L 67/12 700/276 |
| 2016/0131605 A1* | 5/2016 | Hamrouni .............. | G01N 25/18 702/183 |
| 2019/0111813 A1 | 4/2019 | Hoshi et al. | |

(Continued)

FOREIGN PATENT DOCUMENTS

| | | |
|---|---|---|
| JP | 11-147415 A | 6/1999 |
| JP | 2009-214591 A | 9/2009 |

(Continued)

*Primary Examiner* — Edelmira Bosques
*Assistant Examiner* — Benjamin Trettel
(74) *Attorney, Agent, or Firm* — Dinsmore & Shohl LLP (57) ABSTRACT

An air-conditioning control system acquires settlement information on an electronic settlement performed by an occupant D of a vehicle using a mobile terminal via a car-navigation system from the mobile terminal having an electronic settlement function, and controls an air conditioner on the basis of the acquired settlement information. The settlement information includes a commodity purchased by the electronic settlement or a service having a value paid by the electronic settlement, as a settlement target.

7 Claims, 7 Drawing Sheets

(56) References Cited

U.S. PATENT DOCUMENTS

2020/0047587 A1\*  2/2020  Maeng ............... B60H 1/00878
2021/0155071 A1\*  5/2021  Lange ................ B60H 1/00271

FOREIGN PATENT DOCUMENTS

| JP | 2010-195249 A | 9/2010 |
| JP | 2016-137818 A | 8/2016 |
| JP | 2017-178129 A | 10/2017 |

\* cited by examiner

FIG. 1

SETTLEMENT INFORMATION A

| SETTLEMENT NUMBER | SETTLEMENT DATE/TIME | SETTLEMENT COUNTERPART | SETTLEMENT TARGET | VENTILATION INSTRUCTION |
|---|---|---|---|---|
| 0050021 | 2019/2/2 12:00 | AA HAMBURGER SHOP | FOOD AND DRINK | — |

SETTLEMENT INFORMATION B

| SETTLEMENT NUMBER | SETTLEMENT DATE/TIME | SETTLEMENT COUNTERPART | SETTLEMENT TARGET | VENTILATION INSTRUCTION |
|---|---|---|---|---|
| 0050122 | 2019/2/9 10:00 | BB HOSPITAL | MEDICAL CARE (INFLUENZA) | — |

SETTLEMENT INFORMATION C

| SETTLEMENT NUMBER | SETTLEMENT DATE/TIME | SETTLEMENT COUNTERPART | SETTLEMENT TARGET | VENTILATION INSTRUCTION |
|---|---|---|---|---|
| 0050125 | 2019/3/9 12:00 | C HOSPITAL | — | ○ |

CONTROL CONTENT TABLE

| SETTLEMENT TARGET | CONTROL CONTENT |
|---|---|
| FOOD AND DRINK | CONTROL A (EXTERNAL AIR INTRODUCTION + FACE) |
| PET | CONTROL A (EXTERNAL AIR INTRODUCTION + FACE) |
| MEDICAL CARE FOR PET | CONTROL A (EXTERNAL AIR INTRODUCTION + FACE) |
| INFLUENZA THERAPEUTIC AGENT | CONTROL B (EXTERNAL AIR INTRODUCTION) |
| MEDICAL CARE (INFLUENZA) | CONTROL B (EXTERNAL AIR INTRODUCTION) |
| ... | ... |
| EVERYDAY ITEMS | STATUS QUO |
| FRESH FOOD | STATUS QUO |
| CONFECTIONERY | STATUS QUO |
| PROVISION OF FOOD AND DRINK | STATUS QUO |
| ... | ... |

- FOOD AND DRINK, PET, MEDICAL CARE FOR PET: ODOROUS SETTLEMENT TARGET
- INFLUENZA THERAPEUTIC AGENT, MEDICAL CARE (INFLUENZA): INFECTIOUS DISEASE SETTLEMENT TARGET

AIR-CONDITIONER CONTROL SYSTEM RESPONSIVE TO AN ELECTRONIC SETTLEMENT, AND COMPUTER-READABLE STORAGE MEDIUM THAT STORES THEREIN AIR-CONDITIONING CONTROL PROGRAM RESPONSIVE TO AN ELECTRONIC SETTLEMENT

CROSS REFERENCE TO RELATED APPLICATION

This application claims priority to Japanese Patent Application No. 2020-048921 filed on Mar. 19, 2020, which is incorporated herein by reference in its entirety including the specification, claims, drawings, and abstract.

TECHNICAL FIELD

This disclosure relates to an air-conditioning control system that controls an air conditioner of a vehicle, and to a computer-readable storage medium that stores therein an air-conditioning control program.

BACKGROUND

JP 2016-137818 A discloses an air-conditioning control system that estimates the concentration of carbon dioxide in a vehicle compartment in order to control an air conditioner of the vehicle. In the air-conditioning control system, the concentration of carbon dioxide is detected by a detection unit of gas or estimated from the number of occupants on board and the body weight of the occupants of the vehicle or the boarding time.

SUMMARY

In the abovementioned JP 2016-137818 A, the air conditioner of the vehicle is controlled in view of the concentration of carbon dioxide in the vehicle compartment; however, control of the air conditioner of the vehicle is demanded in other cases. For example, in some cases where an occupant of the vehicle has brought into the vehicle compartment an article that emits an odor, such as food and drink, the vehicle compartment is demanded to be ventilated so as to prevent the odor from being trapped in the vehicle compartment. Moreover, in some cases where the occupants of the vehicle include a patient suffering an infectious disease, and a pathogen of the infectious disease is brought into the vehicle compartment, the vehicle compartment is demanded to be ventilated so as to prevent infection of the fellow passengers with the infectious disease. In this manner, in some cases the air-conditioning in the vehicle is demanded to be controlled in accordance with the article brought into the vehicle compartment by the occupant of the vehicle. However, the air-conditioning control system described in the abovementioned JP 2016-137818 A does not consider the abovementioned circumstances, and there is room for improvement in the air-conditioning control.

An object of this disclosure is to provide an air-conditioning control system that can control an air conditioner in accordance with an article brought into a vehicle compartment by an occupant of the vehicle, and a computer-readable storage medium that stores therein an air-conditioning control program.

(1) An air-conditioning control system according to this disclosure is an air-conditioning control system that controls an air conditioner of a vehicle, and includes: an acquisition unit that acquires settlement information on an electronic settlement performed by an occupant of the vehicle; and an air-conditioning control unit that controls the air conditioner on the basis of the settlement information, in which the settlement information includes a commodity purchased by the electronic settlement or service having a value paid by the electronic settlement, as a settlement target, and the air-conditioning control unit controls the air conditioner in accordance with a control content of the air conditioner, which is stored in a storage unit in association with the settlement target.

The electronic settlement performed by the occupant of the vehicle is used for, for example, the purchase of take-out food and drink that is brought into the vehicle compartment, or payment with respect to the medical care or the like for a patient of the infectious disease, so that in some cases the settlement information on the electronic settlement may indicate an article that is brought into the vehicle compartment by the occupant of the vehicle. With the abovementioned configuration, the control in accordance with the commodity purchased by the electronic settlement or the service having a value paid by the electronic settlement, which is included in the settlement information, is performed with respect to the air conditioner, so that it is possible to control the air conditioner in accordance with the article brought into the vehicle compartment by the occupant of the vehicle.

(2) The settlement information may include a commodity that emits an odor purchased by the electronic settlement or a service with respect to an article that emits an odor having a value paid by the electronic settlement, as an odor settlement target, and the control content corresponding to the odor settlement target may include either one or both of first control of causing the air conditioner to operate in an external air introduction mode, and second control of causing air from the air conditioner to blow from, among upper and lower nozzles in the vehicle, the upper nozzle.

In a case where the settlement target is the abovementioned odor settlement target, there is a possibility that a commodity or an article that emits an odor has been brought into the vehicle compartment. In other words, with the above-mentioned configuration, in a case where there is a possibility that a commodity or an article that emits an odor has been brought into the vehicle compartment, at least one of the first control and the second control is performed. With the first control, it is possible to make the odor difficult to be trapped in the vehicle compartment. Moreover, with the second control, it is possible to cause the odor to flow from the vicinity of an upper body of the occupant of the vehicle to a rear part in the vehicle compartment. Accordingly, with the above-mentioned configuration, it is possible to perform control of the air conditioner in accordance with the article brought into the vehicle compartment by the occupant of the vehicle.

(3) The commodity that emits an odor in the abovementioned (2) may include food and drink.

With the above-mentioned configuration, even when food and drink is brought into the vehicle compartment by take-out or the like, with the first control, it is possible to make the odor of the food and drink difficult to be trapped in the vehicle compartment. Moreover, with the second control, it is possible to cause the odor of the food and drink to flow from the vicinity of the upper body of the occupant of the vehicle to the rear part in the vehicle compartment.

(4) The commodity that emits an odor or the article that emits an odor in the above-mentioned (2) may include an animal.

With the above-mentioned configuration, even when an animal is brought into the vehicle compartment, with the first control, it is possible to make the odor of the animal difficult to be trapped in the vehicle compartment. Moreover, with the second control, it is possible to cause the odor of the animal to flow from the vicinity of the upper body of the occupant of the vehicle to the rear part in the vehicle compartment.

(5) The settlement target may include a therapeutic agent for an infectious disease purchased by the electronic settlement or service with respect to the infectious disease having a value paid by the electronic settlement, as an infectious disease settlement target, and the control content corresponding to the infectious disease settlement target may include control of causing the air conditioner to operate in the external air introduction mode.

In a case where the settlement target is the above-mentioned infectious disease settlement target, there is a possibility that an occupant of the vehicle who has been infected with the infectious disease is present, and germs of the infectious disease have been brought into the vehicle compartment. In the above-mentioned configuration, in a case where there is a possibility that germs of the infectious disease have been brought into the vehicle compartment, the air conditioner is controlled to the external air introduction mode. Therefore, it is possible to make a pathogen of the infectious disease difficult to be trapped in the vehicle compartment, and make the infection of the infectious disease to another person difficult to occur. Accordingly, with the above-mentioned configuration, it is possible to perform better control of the air conditioner in accordance with the article brought into the vehicle compartment by the occupant of the vehicle.

(6) In the above-mentioned (5), the acquisition unit may acquire an instruction to cause the air conditioner to operate in the external air introduction mode from a medical expert, and the air-conditioning control unit may cause the air conditioner to operate in the external air introduction mode on the basis of the instruction.

With the above-mentioned configuration, the air conditioner is caused to operate in the external air introduction mode on the basis of the instruction from the medical expert, so that it is possible to perform the control of the air conditioner better for the occupant in the vehicle compartment.

(7) A computer-readable storage medium according to this disclosure is a non-transient computer-readable storage medium that stores therein an air-conditioning control program, and the air-conditioning control program causes a processor of a computer that controls an air conditioner of a vehicle to execute: an acquisition step of acquiring settlement information on an electronic settlement performed by an occupant of the vehicle; and an air-conditioning control step of controlling the air conditioner on the basis of the settlement information, in which the settlement information includes a commodity purchased by the electronic settlement or service having a value paid by the electronic settlement, as a settlement target, and in the air-conditioning control step, the air conditioner is controlled in accordance with a control content of the air conditioner, which is stored in a storage unit by being associated with the settlement target. Note that, such a storage medium is a nonvolatile memory, for example.

The electronic settlement performed by the occupant of the vehicle is used for, for example, the purchase of take-out food and drink that is brought into the vehicle compartment or payment with respect to medical care or the like for a patient of the infectious disease, so that in some cases the settlement information on the electronic settlement may indicate an article that is brought into the vehicle compartment by the occupant of the vehicle. With the above-mentioned configuration, the control in accordance with the commodity purchased by the electronic settlement or the service having a value paid by the electronic settlement, which is included in the settlement information, is performed with respect to the air conditioner, so that it is possible to control the air conditioner in accordance with the article brought into the vehicle compartment by the occupant of the vehicle.

With this disclosure, it is possible to provide an air-conditioning control system and a program that can control the air conditioner in accordance with the article brought into the vehicle compartment by the occupant of the vehicle.

BRIEF DESCRIPTION OF DRAWINGS

An embodiment of the present disclosure will be described based on the following figures, wherein:

FIG. 5 is a block diagram illustrating a configuration of the air-conditioning control system and the like;

DESCRIPTION OF EMBODIMENT

Hereinafter, an air-conditioning control system 10 according to an embodiment of this disclosure will be described with reference to the drawings. Hereinafter, in all the drawings, similar elements are denoted by the same reference numerals, and repeated explanations thereof are omitted.

Figure 1:
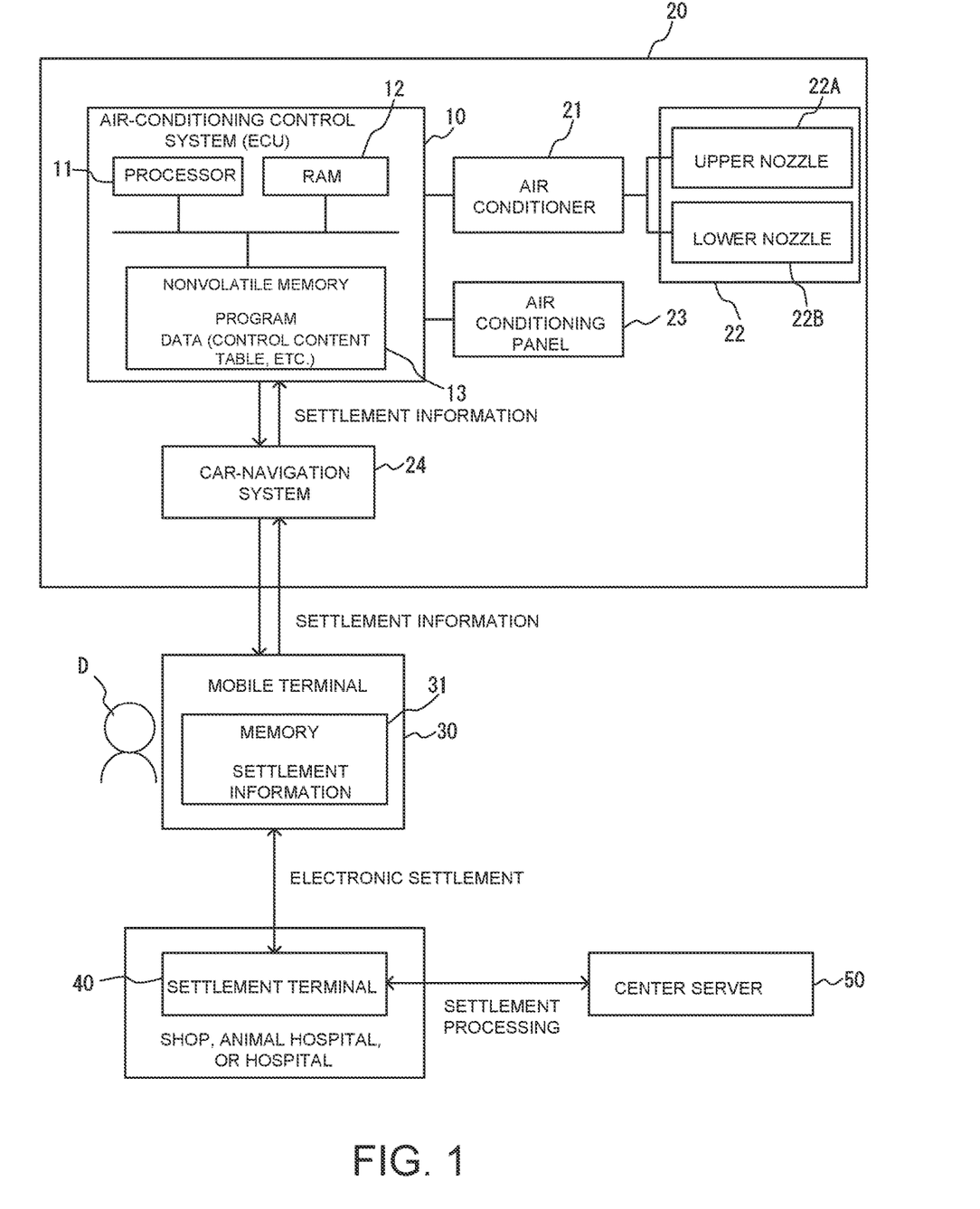
FIG. 1 is a configuration diagram illustrating an air-conditioning control system according to an embodiment of this disclosure, and respective devices, such as an air conditioner, that are mounted to a vehicle, a mobile terminal, a settlement terminal, and a center server.

As illustrated in FIG. 1, the air-conditioning control system 10 is mounted to a vehicle 20. An air conditioner 21, a nozzle 22, an air-conditioning panel 23, and a car-navigation system 24 are further mounted to the vehicle 20.

The air-conditioning control system 10 controls an operation of the air conditioner 21. The air-conditioning control system 10 includes a computer such as an electronic control unit (ECU). The air-conditioning control system 10 is provided with a processor 11, a random access memory (RAM) 12 that functions as a main memory of the processor 11, and a nonvolatile memory 13 that stores therein a program and data that are executed or used by the processor 11.

The processor 11 includes, for example, a central processing unit (CPU). The processor 11 may be configured as a one-chip device into which the RAM 12 is incorporated.

The nonvolatile memory 13 includes, for example, a flash memory, a hard disk, a solid state drive (SSD), or a read only memory (ROM).

The processor 11 executes a program that is stored in the nonvolatile memory 13, and uses data that are stored in the nonvolatile memory 13, thereby actually controlling an operation of the air conditioner 21 by the air-conditioning control system 10. The data that are stored in the nonvolatile memory 13 include a control content table, which is described later. Processing that is performed by the processor 11; in other words, an operation of the air-conditioning control system 10, is described later. The air-conditioning control system 10 is communicable with the air conditioner 21, the air-conditioning panel 23, and the car-navigation system 24, via an input/output port, which is not illustrated.

The air conditioner 21 has a cooling operation function of cooling air and discharging the air from the nozzle 22, and a heating operation function of heating air and discharging the air from the nozzle 22. In addition, the air conditioner 21 also has a blowing function of discharging air, without cooling, for example, from the nozzle 22 without any change. The air to be discharged from the nozzle 22 by these functions is also collectively referred to as air-conditioning air. The nozzle 22 from which the air-conditioning air is discharged includes an upper nozzle 22A, which is disposed on a dashboard, from which air-conditioning air is discharged to an upper body of an occupant, and a lower nozzle 22B, which is disposed at the occupant's feet, from which air-conditioning air is discharged to the feet.

The air conditioner 21 includes a plurality of operation modes. The plurality of the operation modes include an face mode in which air-conditioning air is blown from the upper nozzle 22A, a foot mode in which air-conditioning air is blown from the lower nozzle 22B, and a face and foot mode in which air-conditioning air is blown from each of the upper nozzle 22A and the lower nozzle 22B. In addition, the plurality of the operation modes include an external air introduction mode in which external air is introduced into a vehicle compartment of the vehicle 20, and an air recirculation mode in which no external air is introduced into the vehicle compartment of the vehicle 20 but air in the vehicle compartment is recirculated.

The air-conditioning panel 23 is an operation device for operating the air conditioner 21. An operation content with respect to the air-conditioning panel 23 is supplied to the air-conditioning control system 10. The air-conditioning control system 10 causes the air conditioner 21 to operate in accordance with the supplied operation content. Specifically, the air-conditioning control system 10 causes the air conditioner 21 to operate, in accordance with the operation content, in any of the cooling operation, the heating operation, and the air blowing. In addition, the air-conditioning control system 10 can also cause the air conditioner 21 to operate, in accordance with the operation content, in any of the face mode, the foot mode, and the face and foot mode. In addition, the air-conditioning control system 10 can also cause the air conditioner 21 to operate, in accordance with the operation content, in either of the external air introduction mode and the air recirculation mode.

The car-navigation system 24 has a general function of navigation systems, and is configured so as to be communicable with a mobile terminal 30, such as a smartphone, a tablet, or a transportable personal computer, which is owned by an occupant D of the vehicle 20. The car-navigation system 24 is configured so as to be communicable with the mobile terminal 30, for example, via Bluetooth (registered trademark), which is the standard of near field communication. The mobile terminal 30 has an electronic settlement function. The electronic settlement function may either one or both of a settlement function by credit card and a settlement function by electronic money.

The air-conditioning control system 10 acquires settlement information on an electronic settlement performed by the occupant D of the vehicle 20 using the mobile terminal 30 via the car-navigation system 24, from the mobile terminal 30 having an electronic settlement function, and controls the air conditioner 21 on the basis of the acquired settlement information. The settlement information includes a commodity purchased by the electronic settlement or service having a value paid by the electronic settlement, as a settlement target. In a case where a settlement target included in settlement information is food and drink, the air-conditioning control system 10 controls the air conditioner 21 to the external air introduction mode and the face mode. In addition, in a case where a settlement target included in settlement information is medical care for an infectious disease, the air-conditioning control system 10 controls the air conditioner 21 to the external air introduction mode. Hereinafter, after the electronic settlement and the settlement information are described, the control of the air conditioner 21 by the air-conditioning control system 10 is described.

As described above, the mobile terminal 30 communicates with various kinds of settlement terminals 40 installed in shops such as eating houses, animal hospitals, hospitals, and pharmacies to perform electronic settlements. The settlement terminal 40 communicates with a center server 50 in a credit card company, an agency company thereof, or the like to perform settlement processing.

The electronic settlement includes a payment for the purchase of a commodity, and a payment with respect to service. Examples of the commodity can include food and drink, everyday items, fresh food, and pharmaceutical preparations. The food and drink include take-out food and drink. Examples of the service can include medical care for a person, medical care for a pet, and provision of food and drink. The provision of food and drink is more specifically provision of a meal in an eating house such as a restaurant.

At the time of the electronic settlement, the settlement terminal 40 generates settlement information indicating a settlement content of the electronic settlement, and supplies the generated settlement information to the mobile terminal 30.

Figure 2:
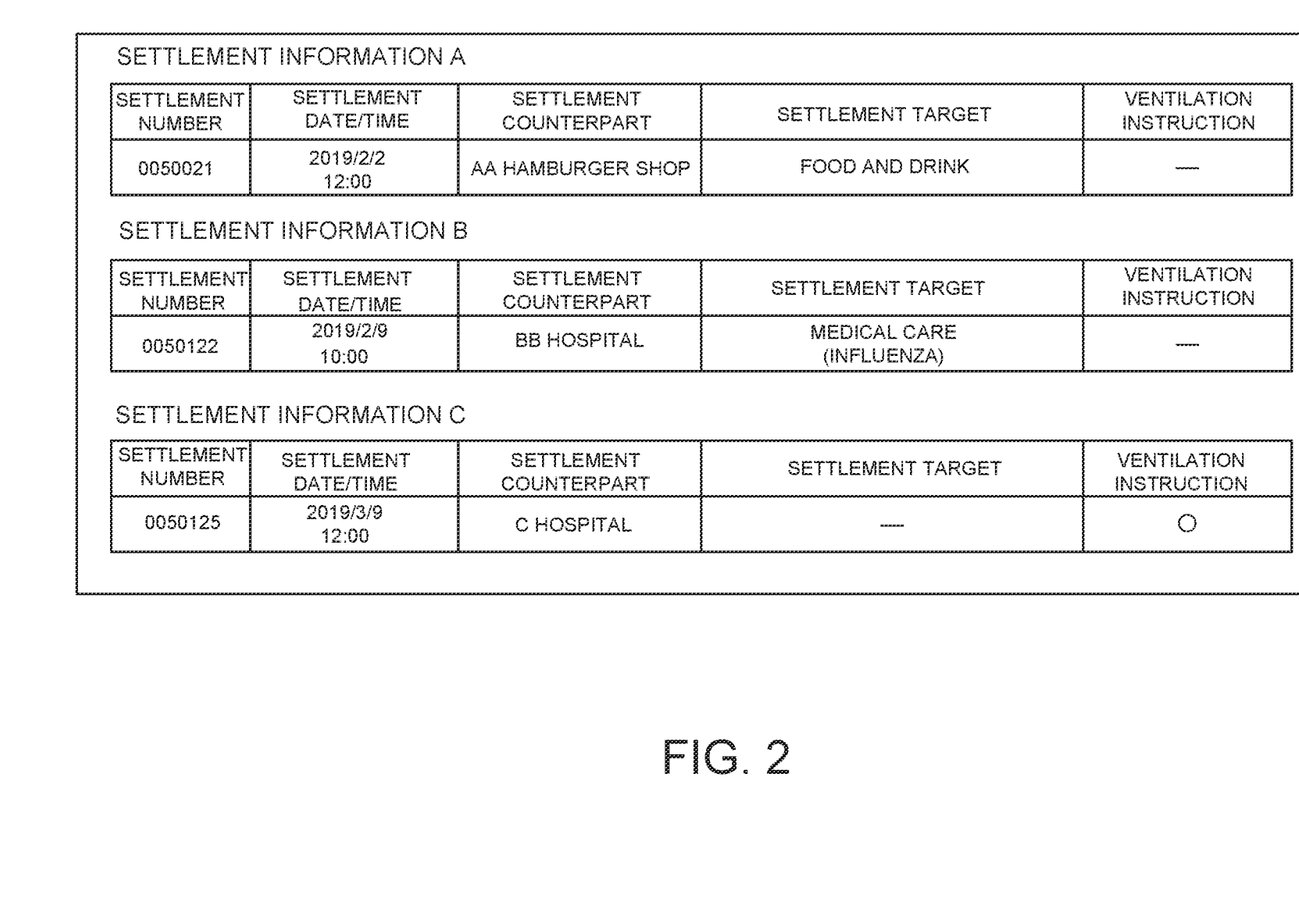
FIG. 2 is a diagram illustrating an example of settlement information.

The settlement information includes, as illustrated in settlement information A and settlement information B in FIG. 2, a "settlement number" that identifies each electronic settlement, "settlement date/time" that specifies date/time when the electronic settlement was performed, a "settlement counterpart" of the electronic settlement, and a "settlement target" that is information on the commodity purchased or service having a value paid, by the electronic settlement. The settlement information can further include information on a "ventilation instruction".

The "settlement number" is assigned by the center server 50, for example, when the settlement processing is executed. The "settlement date/time" includes, as illustrated in settlement information A to C in FIG. 2, year, month, and day, and time. The "settlement date/time" is assigned as a time stamp by the center server 50 when the settlement processing is executed. The "settlement number" and the "settlement date/time" are transmitted from the center server 50 to the settlement terminal 40, at the time of electronic settlement. The "settlement counterpart" is the name of a shop, a pharmacy, an animal hospital, or a hospital where the settlement terminal 40 is installed, and is registered in advance in the relevant settlement terminal 40.

Figure 3:
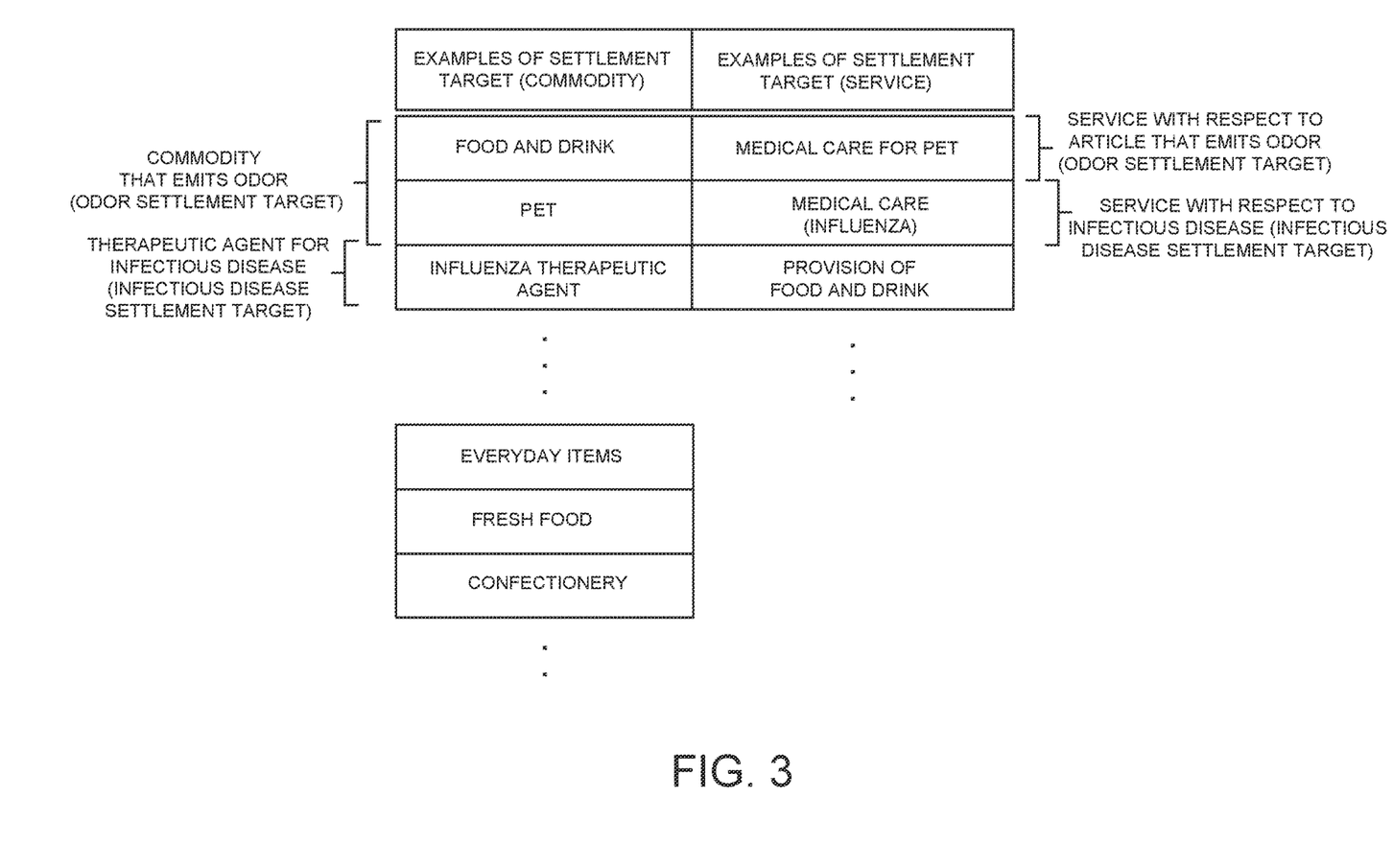
FIG. 3 is a diagram illustrating contents of the settlement information.

The "settlement target" is indicated as the type, such as "food and drink" and "medical care (influenza)", as illustrated in the settlement information A and the settlement information B in FIG. 2. The type is a type set in advance so as to be used in the control of the air conditioner 21, which is described later. FIG. 3 illustrates a specific example of types to be used as the "settlement target" in this embodiment. As illustrated in FIG. 3, the "settlement target" includes, as a type indicating a commodity, "food and drink", "pet", "influenza therapeutic agent", "everyday items", "fresh food", and "confectionery". The "settlement target" includes, as a type indicating service, "medical care for a pet", "medical care (influenza)", and "provision of food and drink".

Among the settlement targets illustrated in FIG. 3, "food and drink" and "pet" include articles that emit an odor, such as a hamburger and a dog, and thus belong to a commodity that emits an odor. The "medical care for a pet" is targeted for a pet that emits an odor, and thus belongs to service with respect to an article that emits an odor. These commodity and service are also referred to as odor settlement targets. Among the settlement targets, the "influenza therapeutic agent" is a therapeutic agent for influenza that is an infectious disease, and the "medical care (influenza)" is service with respect to the influenza. Such a therapeutic agent for an infectious disease and service with respect to an infectious disease are also referred to as infectious disease settlement targets. Note that, the service with respect to an infectious disease also includes, in addition to treatment for an infectious disease, a diagnosis of an infectious disease as a disease of a patient.

The "settlement target" is input, for example, by a salesperson of the shop, a staff member of the animal hospital, or a staff member of the hospital, into the settlement terminal 40, at the time of the electronic settlement. For example, the settlement terminal 40 presents the respective types illustrated in FIG. 3, as target candidates for the electronic settlement this time, to the salesperson or staff member, on the display device, and the salesperson or staff member selects one or more target candidates, so that the selected target candidate is input to the settlement terminal 40 as a "settlement target". Note that in some cases a plurality of commodities and the like are purchased at a single electronic settlement, so that the settlement information may include a plurality of settlement targets.

The "ventilation instruction" is an instruction to cause the air conditioner 21 to operate in the external air introduction mode. The ventilation instruction is issued, for example, when a medical doctor has made a diagnosis that a person who received a medical care that is a target of an electronic settlement with respect to the hospital is infected with an infectious disease. Examples of the person who received the medical care can include, in addition to the occupant D of the vehicle 20, another occupant of the vehicle 20, a family member of the occupant D, and the like. This ventilation instruction is input to the settlement terminal 40, for example, by a staff member of the hospital, at the time of accounting for performing the electronic settlement. The settlement information C includes a ventilation instruction. The ventilation instruction is input to the settlement terminal 40, for example, in the electronic settlement at the hospital, in a case where the occupant D who has the mobile terminal 30 refuses to input settlement information including a disease name, such as "medical care (influenza)", to the settlement terminal 40. Accordingly, the settlement information including a ventilation instruction does not include a settlement target, as is the settlement information C.

The settlement terminal 40 generates settlement information, at the time of the electronic settlement, by combining the "settlement number" and the "settlement date/time" supplied from the center server 50, the "settlement counterpart" registered in the relevant settlement terminal 40, and either one or both of the "settlement target" and the "ventilation instruction" input to the relevant settlement terminal 40. The settlement terminal 40 supplies the generated settlement information to the mobile terminal 30. The mobile terminal 30 stores the settlement information from the settlement terminal 40 in a memory 31 included in the relevant mobile terminal 30. The electronic settlement is performed before the vehicle 20 starts; in other words, before the occupant D gets on the vehicle 20. In addition, in some cases the electronic settlement is performed in a drive-through and the like while the occupant D rides in the vehicle 20 after the vehicle 20 has started.

Figure 4:
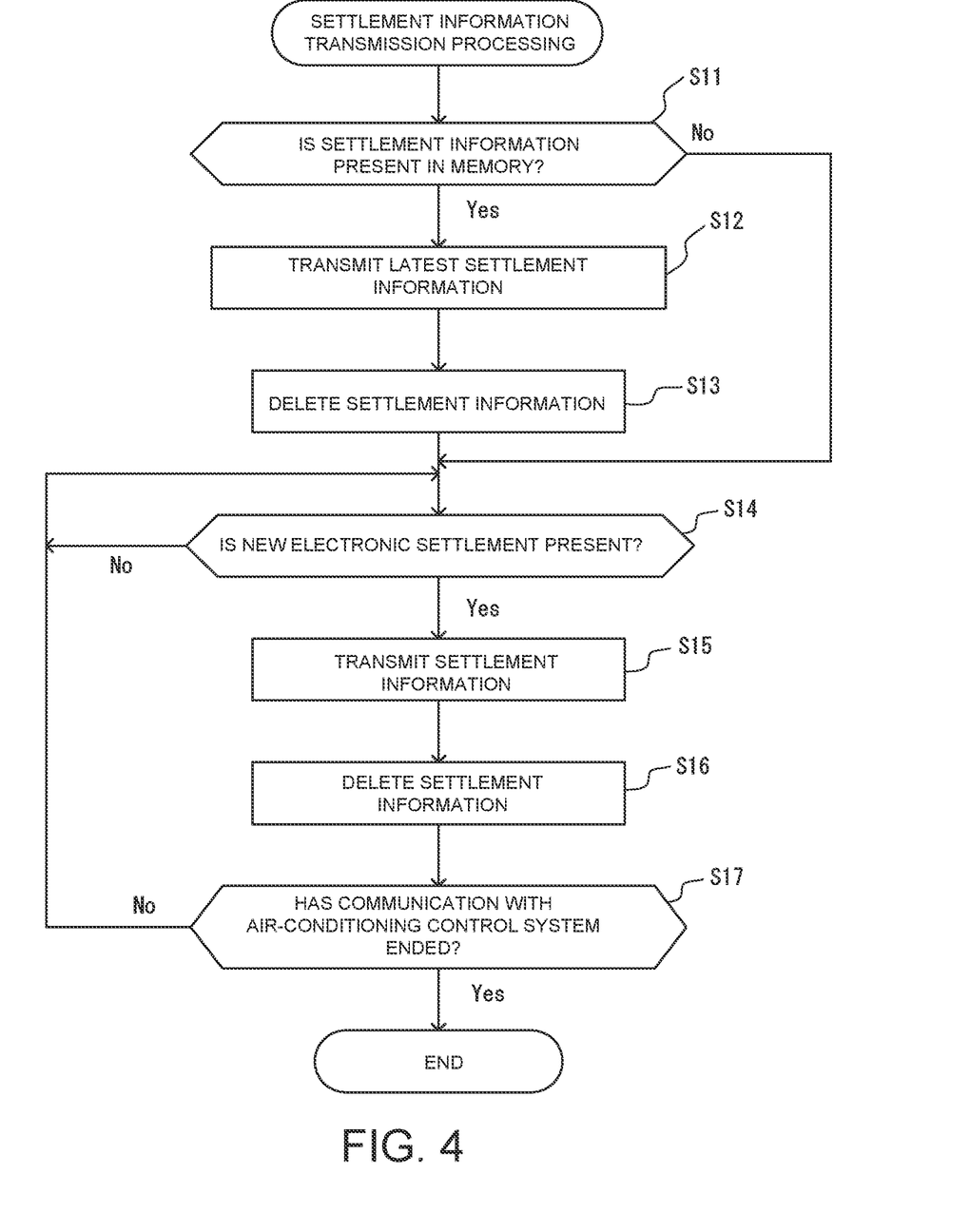
FIG. 4 is a flowchart of settlement information transmission processing executed by the mobile terminal.

The mobile terminal 30 becomes communicable with the air-conditioning control system 10 via the car-navigation system 24, after the vehicle 20 has started. Thereafter, the mobile terminal 30 executes settlement information transmission processing for transmitting the settlement information to the air-conditioning control system 10, which is illustrated in FIG. 4.

The mobile terminal 30 firstly determines whether settlement information is stored in the memory 31, in the settlement information transmission processing (Step S11). If the settlement information is stored in the memory 31 (Step S11: Yes), the mobile terminal 30 transmits, among one or more pieces of settlement information stored in the memory 31, settlement information in which the "settlement date/time" is within a predetermined time from the present, for example, settlement information indicating date/time within one hour, to the air-conditioning control system 10 (Step S12). Thereafter, the mobile terminal 30 deletes all the settlement information (Step S13). With Step S12, among the electronic settlements performed by the occupant D before getting in the vehicle 20, settlement information related to the latest electronic settlement is supplied to the air-conditioning control system 10. With Step S13, the same settlement information is prevented from being transmitted to the air-conditioning control system 10 a plurality of times.

After Step S13, or if no settlement information is stored in the memory 31 (Step S11: No), the mobile terminal 30 determines whether a new electronic settlement has been performed (Step S14). The relevant new electronic settlement is an electronic settlement performed in the drive-through or the like after the vehicle 20 has started. If no new electronic settlement has been performed (Step S14: No), the mobile terminal 30 again executes Step S14. If a new electronic settlement has been performed (Step S14: Yes), the mobile terminal 30 transmits settlement information newly stored in the memory 31 by the relevant electronic settlement, to the air-conditioning control system 10 (Step S15). Thereafter, the mobile terminal 30 deletes the relevant settlement information from the memory 31 (Step S16).

After Step S16, the mobile terminal 30 determines whether the communication with the air-conditioning control system 10 has ended (Step S17), and ends the settlement information transmission processing if it has ended (Step S17: Yes). The communication with the air-conditioning control system 10 is ended, for example, when an ignition switch of the vehicle 20 is turned off. If the communication with the air-conditioning control system 10 has not ended (Step S17: No), the mobile terminal 30 again executes Step S14.

With the processing as the above, the mobile terminal 30 supplies one or more pieces of settlement information to the air-conditioning control system 10 via the car-navigation system 24, in Step S12 or S15.

Figure 5:
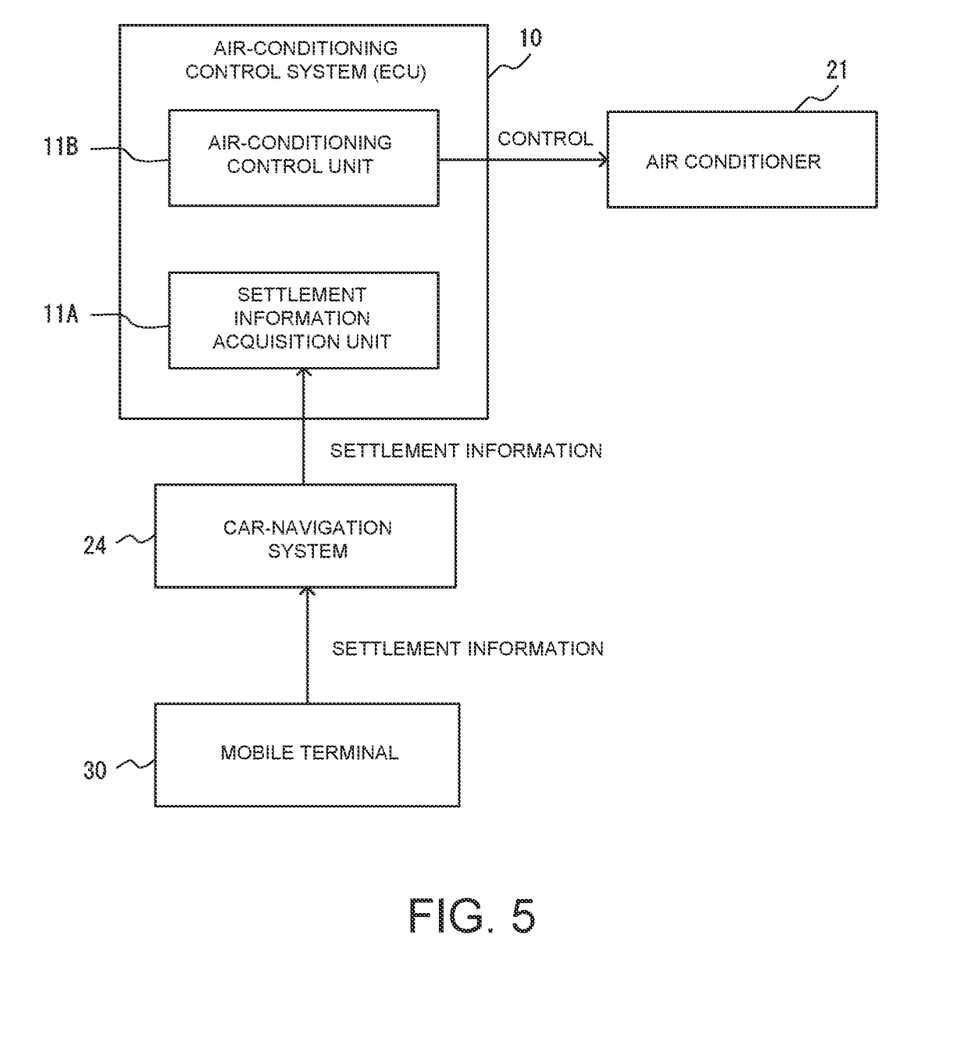

Next, the control of the air conditioner 21 by the air-conditioning control system 10 will be described. In the air-conditioning control system 10, the processor 11 executes a program to operate as a settlement information acquisition unit 11A and an air-conditioning control unit 11B illustrated in FIG. 5, and controls the air conditioner 21. The settlement information acquisition unit 11A receives one or more pieces of settlement information transmitted from the mobile terminal 30, thereby acquiring the relevant settlement information. The air-conditioning control unit 11B executes air-conditioning control processing illustrated in FIG. 6, and performs control of the air conditioner 21 based on the settlement information acquired by the settlement information acquisition unit 11A.

Figure 6:
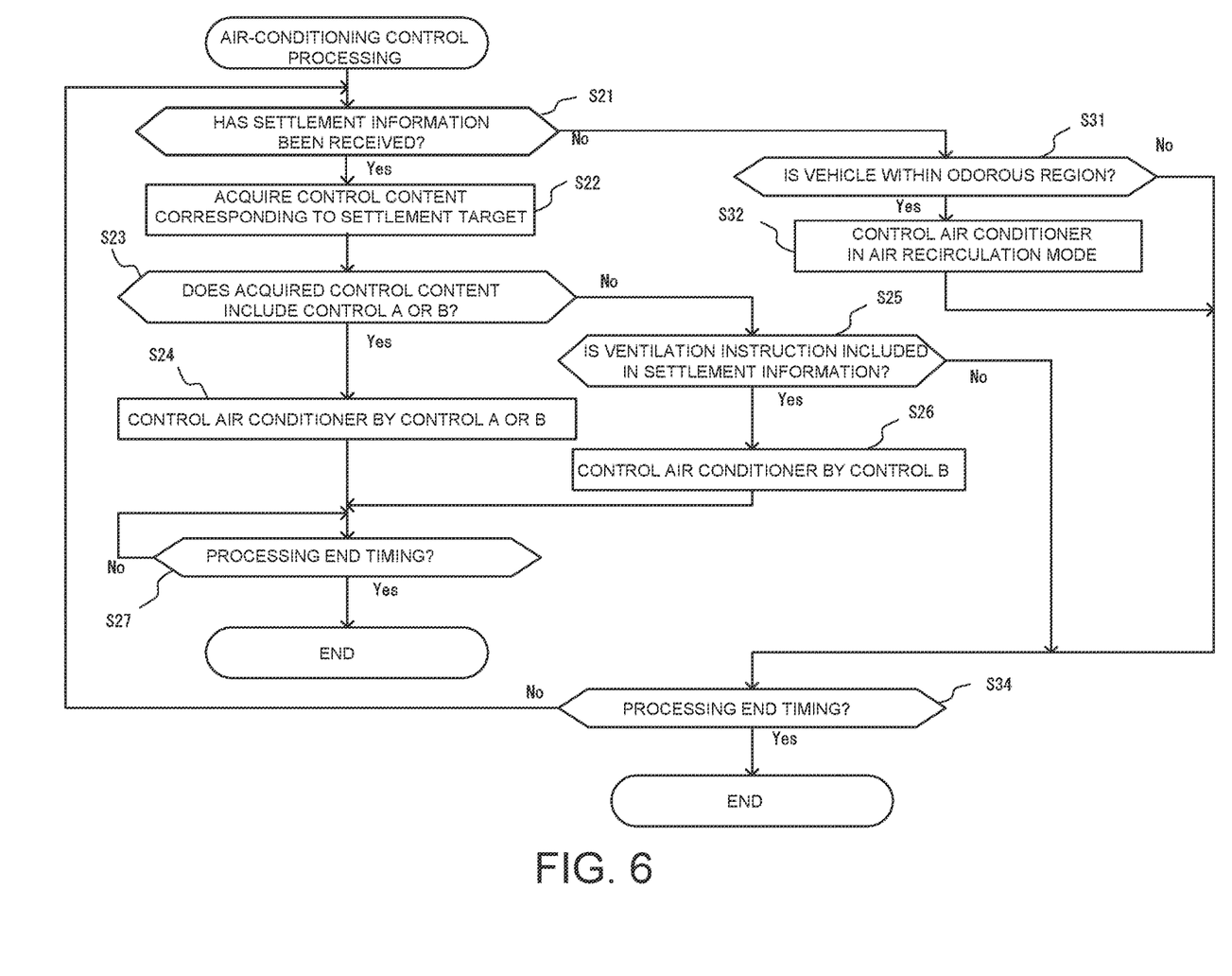
FIG. 6 is a flowchart of air-conditioning control processing executed by an air-conditioning control unit of the air-conditioning control system.

In the air-conditioning control processing, the air-conditioning control unit 11B firstly determines whether the settlement information acquisition unit 11A has acquired one or more pieces of settlement information (Step S21). If the settlement information acquisition unit 11A has received one or more pieces of settlement information (Step S21: Yes), the air-conditioning control unit 11B refers to a control content table illustrated in FIG. 7 on the basis of a settlement target included in each of the one or more pieces of settlement information, and acquires a control content of the air conditioner corresponding to the relevant type (Step S22).

Figure 7:
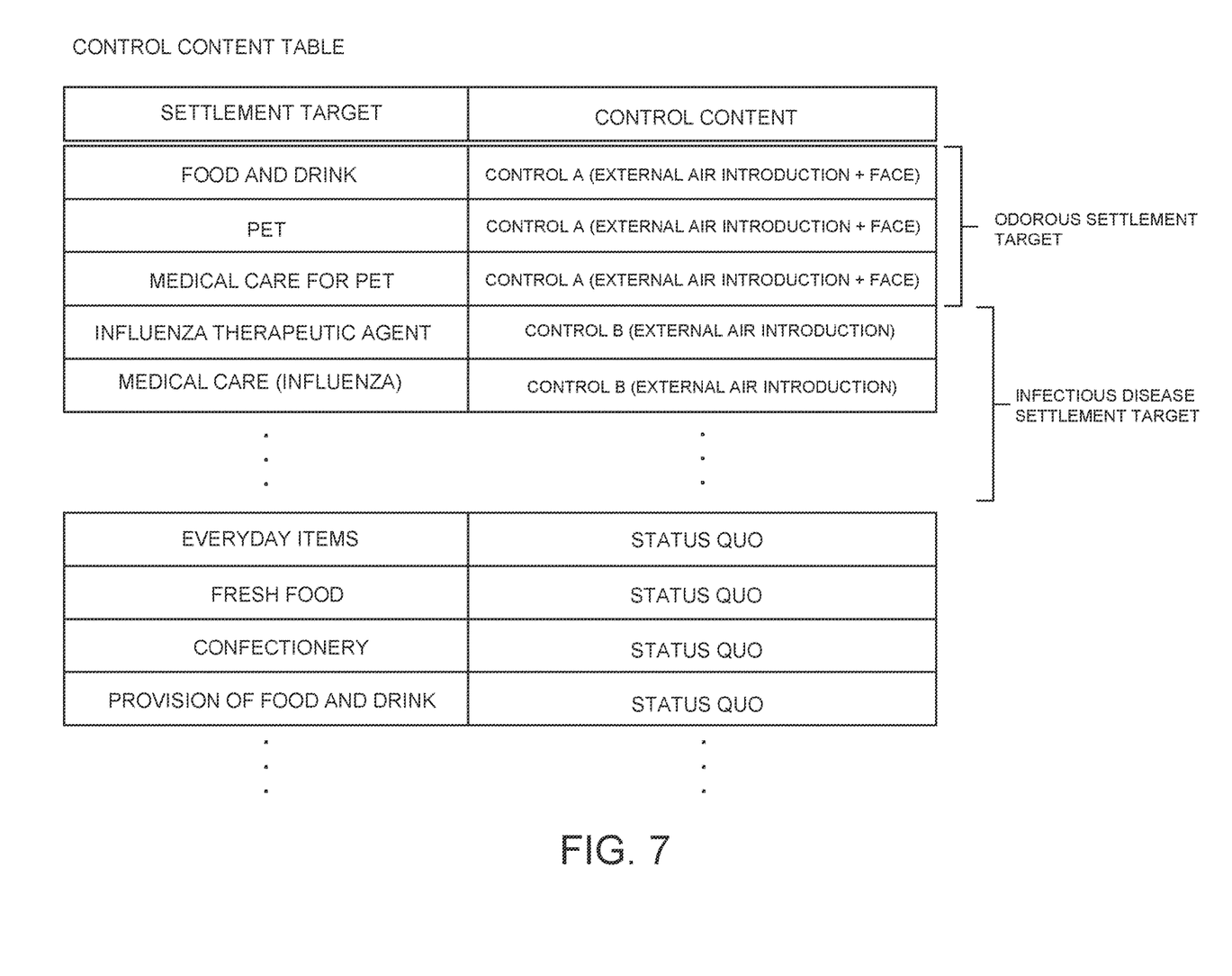
FIG. 7 is a diagram illustrating an example of a control content table.

In the control content table, as illustrated in FIG. 7, a control content of the air conditioner 21 is allocated to each "settlement target". In the control content table, each of the food and drink, the pet, and the medical care for a pet, which are odor settlement targets, among the settlement targets, is associated with a control A. The control A is control of causing the air conditioner 21 to operate in the external air introduction mode and the face mode. In addition, the infectious disease settlement target such as the influenza therapeutic agent or the medical care (influenza), among the settlement targets, is associated with a control B. The control B is control of causing the air conditioner 21 to operate in the external air introduction mode. Among the settlement targets, the other settlement targets such as the everyday items, the fresh food, the confectionery, and the provision of food and drink, other than the odor settlement targets and the infectious disease settlement targets, are associated with a status quo control content of maintaining the current operation mode or the like of the air conditioner 21.

The air-conditioning control unit 11B acquires a control content corresponding to a settlement target included in each settlement information, from the control content table, in Step S22. In a case where the settlement information acquisition unit 11A has acquired a plurality of pieces of settlement information or a case where the settlement information includes a plurality of settlement targets, the air-conditioning control unit 11B acquires control contents corresponding to all the settlement targets.

Thereafter, the air-conditioning control unit 11B determines whether one or more control contents acquired in Step S22 include the control content of the control A or B (Step S23). If the control content of the control A or B is included (Step S23: Yes), the air-conditioning control unit 11B controls the air conditioner 21 by the control A or B included in the one or more control contents (Step S24). Specifically, in a case where the air-conditioning control unit 11B has acquired the control A in Step S22, the air-conditioning control unit 11B performs the control A with respect to the air conditioner 21, and controls the air conditioner 21 in the external air introduction mode and the face mode. Specifically, the air-conditioning control unit 11B changes, when the air conditioner 21 is in an air recirculation mode, the air recirculation mode to the external air introduction mode, and maintains, when the air conditioner 21 is already in the external air introduction mode, the relevant external air introduction mode (the same applies to the control B and the like, which are described later). Similarly, the air-conditioning control unit 11B changes, when the air conditioner 21 is in a mode other than the face mode, the relevant mode to the face mode, and maintains, when the air conditioner 21 is already in the face mode, the relevant mode. In a case where the air-conditioning control unit 11B has acquired the control B in Step S22, the air-conditioning control unit 11B performs the control B with respect to the air conditioner 21, and controls the air conditioner 21 in the external air introduction mode. In a case where the air-conditioning control unit 11B has acquired both of the control A and B at Step S22, the air-conditioning control unit 11B controls the air conditioner 21 by the control B, for example. If none of one or more control contents acquired at Step S22 is the control A nor B (Step S23; No), the air-conditioning control unit 11B determines whether a ventilation instruction is included in any of the one or more pieces of settlement information (Step S25). If information on the ventilation instruction is included (Step S25: Yes), the air-conditioning control unit 11B performs the control B with respect to the air conditioner 21 (Step S26). If information on the ventilation instruction is included in none of the one or more pieces of settlement information (Step S25: No), the control content is neither the control A nor the control B, but is the status quo, so that the air-conditioning control unit 11B causes the processing to proceed to Step S34 without any change.

The air-conditioning control unit 11B determines whether the present is at end timing of the air-conditioning control processing in Step S34, and executes again the processing in Step S21 if it is not the end timing (Step S34: No). Therefore, the processing in Step S21 and subsequent Steps is again performed with respect to the settlement information of the electronic settlement performed by the occupant D while riding in the vehicle 20 in the drive-through or the like, for example.

The air-conditioning control unit 11B waits, after Step S24 or S26, until the end timing of the air-conditioning control processing has arrived (Step S27, S27: No). Examples of the end timing of the air-conditioning control processing include timing when the air-conditioning control unit 11B receives a signal indicating that the ignition switch of the vehicle 20 has been turned off. If the end timing has arrived (Step S27: Yes), the air-conditioning control unit 11B ends the air-conditioning control processing.

In a case where the air-conditioning control unit 11B has acquired the control A in Step S22, the settlement target in the settlement information is an odor settlement target, and there is a possibility that the occupant D brings into the vehicle 20 the food and drink purchased before getting on the vehicle 20 or during riding in the vehicle 20 by utilizing the drive-through or the like. In addition, there is also a possibility that the occupant D brings a pet in the vehicle 20 by the purchase or for a visit to an animal hospital. The control A is performed in this case, so that with the external air introduction mode of the control A, it is possible to prevent odor of the food and drink or the pet from being trapped in the vehicle compartment of the vehicle 20. In addition, with the face mode of the control A, it is possible to cause the odor of the food and drink or the pet to flow from the vicinity of an upper body of the occupant D to a rear part of the vehicle compartment in the vehicle 20. Note that, the control A is continued herein to the end timing of the air-conditioning control processing.

In a case where the air-conditioning control unit 11B has acquired the control B in Step S22 or a case where the settlement information includes a ventilation instruction, the occupant D who has performed the electronic settlement may ride in the vehicle 20 in a state of being infected with an infectious disease. Moreover, in a case where the occupant D has performed electronic settlement for another occupant of the vehicle 20; in other words, a fellow passenger, with respect to a hospital or the like, the relevant another occupant may have ridden in the vehicle 20 in a state of being infected with an infectious disease. The control B is performed in this case, so that with the external air introduction mode of the control B, it is possible to ventilate the inside of the vehicle compartment of the vehicle 20, and make a pathogen of an infectious disease brought into the vehicle compartment by the occupant who has been infected with the infectious disease difficult to be trapped in the vehicle compartment. Therefore, it is possible to reduce a possibility that the infectious disease is passed to an occupant other than the occupant of the infectious disease in the vehicle compartment of the vehicle 20. Note that the control A is continued herein until the end timing of the air-conditioning control processing. Note that, in a case where the air-conditioning control unit 11B has acquired both of the control A and B as a control content, the air-conditioning control unit 11B executes the control B with priority for coping with the infectious disease. Therefore, it is possible to reduce a possibility that air-conditioning air from the upper nozzle 22A by the face mode may directly hit a patient who has been infected with the infectious disease.

If the settlement information acquisition unit 11A acquires no settlement information in Step S21 (Step S21: No), the air-conditioning control unit 11B determines whether a current location of the vehicle 20 is within an odorous region with a odor (Step S31). For example, the air-conditioning control unit 11B inquires of the car-navigation system 24 whether the current location of the vehicle 20 is within an odorous region. The odorous region includes at least an inside of a tunnel where an odor of exhaust gas is present. The odorous region also includes a region within a predetermined distance from a factory, a region within a predetermined distance from a stock farm, and the like. The car-navigation system 24, by having received the inquiry, specifies a current location of the vehicle 20 using the global positioning system (GPS). In addition, the car-navigation system 24 determines whether, with map data stored therein, the specified current location of the vehicle 20 is present in the tunnel registered in the map data, and is within a predetermined distance, a radius of 50 m, for example, from the factory or the stock farm registered in the map data. The car-navigation system 24 sends a determination result thereof as a reply to the air-conditioning control unit 11B.

If the determination result sent as a reply from the car-navigation system 24 is negative, the air-conditioning control unit 11B determines that the current location of the vehicle 20 is not within the odorous region (Step S31: No), and causes the processing to proceed to Step S34. If the determination result as a reply sent from the car-navigation system 24 is affirmative, the air-conditioning control unit 11B determines that the current location of the vehicle 20 is within the odorous region (Step S31: Yes). With this determination, the air-conditioning control unit 11B can detect that the current location of the vehicle 20 is within the odorous region. If the current location of the vehicle 20 is within the odorous region, the air-conditioning control unit 11B controls the air conditioner 21 in the air recirculation mode (Step S32), and causes the processing to proceed to Step S34. With the air recirculation mode, it is possible to prevent an odor outside the vehicle 20 from intruding into the vehicle compartment. The air-conditioning control unit 11B may change the mode of the air conditioner 21 to the external air introduction mode, when the vehicle 20 is positioned outside the odorous region, which serves as a trigger. For example, the air-conditioning control unit 11B periodically inquires of the car-navigation system 24 whether the current location of the vehicle 20 is within the odorous region, and controls the air conditioner 21 in the external air introduction mode, when having received a reply that the current location of the vehicle 20 is outside of the odorous region from the car-navigation system 24.

As has been described in the foregoing, in a case where a settlement target included in the settlement information is a commodity that emits an odor or service with respect to an article that emits an odor, the air-conditioning control unit 11B of the air-conditioning control system 10 performs the control A of causing the air conditioner 21 to operate in the external air introduction mode and the face mode. Therefore, when there is a possibility that a commodity or an article that emits an odor has been brought into the vehicle compartment of the vehicle 20 by the occupant D, the air-conditioning control unit 11B can control the air conditioner 21 in the external air introduction mode and the face mode. Accordingly, even when a commodity or an article that emits an odor is brought into the vehicle compartment of the vehicle 20, it is possible to make the odor difficult to be trapped in the vehicle compartment with the external air introduction mode, and cause the odor to flow from the vicinity of the upper body of the occupant of the vehicle to the rear part in the vehicle compartment with the face mode. In addition, with the above-mentioned configuration, the air-conditioning control is performed on the basis of the settlement information, so that the suitable air-conditioning control is performed without providing an odor sensor or the like in the vehicle compartment.

The above-mentioned control A may be either one of control of causing the air conditioner 21 in the external air introduction mode, and control of causing the air conditioner 21 in the face mode. Moreover, the face mode of the control A may be changed to the face and foot mode. The control A only needs to include control of discharging air-conditioning air from at least the upper nozzle 22A in the upper nozzle 22A and the lower nozzle 22B. Note that, when the control to the face mode or the face and foot mode is performed, the quantity of air of the air-conditioning air to be discharged may also be controlled to secure the quantity of air of the air-conditioning air necessary for causing the odor to flow to the rear part in the vehicle compartment of the vehicle 20. The air-conditioning control unit 11B may control the air conditioner 21, and supply into the vehicle compartment a deodorant, a perfume, or the like, with the air-conditioning air.

As the above-mentioned odor settlement target, an article other than the food and drink and the pet may be set. The odor settlement target may be an article set in advance, such as a chemical agent such as a coating material, a specified food and drink such as a hamburger among food and drink, and a fertilizer.

In addition, in a case where the settlement target included in the settlement information is a therapeutic agent for an infectious disease or service with respect to an infectious disease, the air-conditioning control unit 11B of the air-conditioning control system 10 performs the control B of causing the air conditioner 21 to operate in the external air introduction mode. Therefore, when there is a possibility that an occupant of the vehicle 20 who has been infected with an infectious disease is present, the air-conditioning control unit 11B can make a pathogen of the infectious disease difficult to be trapped in the vehicle compartment, with the external air introduction mode. Accordingly, it is possible to make the infectious disease difficult to infect a fellow passenger other than the patient of the infectious disease. Examples of the infectious disease can include an infectious disease that is transmitted by airborne infection or droplet infection.

In addition, even when a therapeutic agent for an infectious disease or service with respect to an infectious disease is not specified as a settlement target of the settlement information, the air-conditioning control unit 11B of the air-conditioning control system 10 performs the control B of causing the air conditioner 21 to operate in the external air introduction mode on the basis of a ventilation instruction, which is an instruction from a medical expert. Therefore, even when the infectious disease cannot be specified from the settlement information, the air conditioner 21 is caused to operate in the external air introduction mode on the basis of the instruction from the medical expert, so that it is possible to perform better air-conditioning control.

Next, modification examples of the above-mentioned embodiment are detailed. At least parts of the modification examples below may be combined.

The "settlement target" included in the settlement information does not need to be a type of a commodity or service, but may be an individual commodity name or an individual service name. The individual commodity name and the individual service name are input to the settlement terminal 40. For example, a commodity name or the like that is obtained such that a bar code reader reads a bar code assigned to the commodity is input to the settlement terminal 40. In this case, in the control content table, the names of commodities, such as curry, hamburger, and a dog, that each emit an odor are associated with the control A. In addition, the names of treatment for influenza, rubella, and the like, which are related to an infectious disease, and the names of a therapeutic agent for influenza and the like are associated with the control B. In other cases, in other words, as for an adhesive plaster or the like serving as a commodity that emits no odor, service, or a pharmaceutical preparation with respect to a disease other than the infectious disease, service with respect to an article that emits no odor, and the like, the operation of the air conditioner 21 is set to the status quo. As the "settlement target", an arbitrary code indicating the commodity or the service, such as a commodity code, may be used.

The control content of the control with respect to the air conditioner 21 that is executed by the air-conditioning control unit 11B of the air-conditioning control system 10 only needs to be stored in the nonvolatile memory 13 by being associated with the settlement target included in the settlement information. Accordingly, the control content and the settlement target are stored in the nonvolatile memory 13, and may be associated with each other in a program that is executed by the processor 11 included in the air-conditioning control unit 11B. For example, the air-conditioning control unit 11B may determine whether a settlement target included in settlement information acquired by the settlement information acquisition unit 11A is the above-mentioned odor settlement target, in accordance with the program, and may execute the control A if having been determined as the odor settlement target. In addition, the air-conditioning control unit 11B may determine whether a settlement target included in settlement information acquired by the settlement information acquisition unit 11A is the above-mentioned infectious disease settlement target, in accordance with the program, and may execute the control B if having been determined as the infectious disease settlement target. The control content of the control with respect to the air conditioner 21 may be stored in another storage unit, other than the nonvolatile memory 13. The storage unit may be provided outside the air-conditioning control system 10.

As a settlement target of the electronic settlement, there may be used arbitrary information other than the above, for example, information that has been used, and information that can specify an article purchased by the electronic settlement or service having a value paid by the electronic settlement. The control content of the air conditioner 21 is also arbitrary.

For example, when the settlement target indicated by the settlement information is a settlement target other than the odor settlement target and the infectious disease settlement target described above, the air-conditioning control unit 11B may perform specified control with respect to the air conditioner 21. Moreover, the air-conditioning control unit 11B may change the set temperature of the cooling operation or the heating operation performed by the air conditioner 21, in accordance with the settlement target. For example, in a case where the settlement target is a commodity of fresh food, especially a perishable product, the air-conditioning control unit 11B may lower the set temperature so as to prevent the perishable product from being spoiled. For example, in a case where the settlement target is a purchase of spicy food such as take-out curry, the air-conditioning control unit 11B may lower the set temperature of the cooling operation or the heating operation of the air conditioner 21 so as to prevent the occupant who eats the curry from feeling hot.

The control B may be control of controlling the air conditioner 21 in the air recirculation mode. When performing the control B in Step S24 in FIG. 6, for example, the air-conditioning control unit 11B detects the number of occupants of the vehicle 20 by a seat sensor or the like, and may control the air conditioner 21 in the air recirculation mode as the control B, if the detected number of occupants is only one person, because the infection of the above-mentioned infectious disease may not occur. Therefore, the pathogen of the infectious disease is difficult to be released to the outside of the vehicle 20. The control B may be either of the external air introduction mode and the air recirculation mode. Which mode of the two modes is employed as the control B depends on whether a designer of the air-conditioning control unit 11B places importance on making the pathogen difficult to be trapped in the vehicle compartment of the vehicle 20 or making the pathogen difficult to be released to the outside of the vehicle 20. Moreover, in a case where the settlement target is medical care for the common cold and the like or a pharmaceutical preparation with respect to the common cold and the like, the air-conditioning control unit 11B may raise the set temperature of the heating operation by the air conditioner 21 so as to prevent the patient from feeling cold.

For example, as an example of the above-mentioned control of the air conditioner 21, the air-conditioning control system 10 may display, before changing the operation of the air conditioner 21, via the car-navigation system 24 and the like, a check screen as to whether the operation of the air conditioner 21 may be changed. In this case, the air-conditioning control system 10 may change the operation of the air conditioner 21 when the occupant of the vehicle has approved the change by manipulating the car-navigation system 24 or the like, and does not need to change the operation of the air conditioner 21 when the occupant of the vehicle has not approved. The change of the operation includes the change from the air recirculation mode to the external air introduction mode, the change from the foot mode to the face mode, the change of the set temperature, and the like.

As described as the above, the air-conditioning control unit 11B only needs to control the air conditioner 21 in accordance with the control content of the air conditioner 21 stored in the storage unit by being associated with the settlement target included in the settlement information of the electronic settlement, and the specific aspect is not limited to the above. Herein, the electronic settlement performed by the occupant D of the vehicle 20 is used for the purchase of take-out food and drink that is brought into the vehicle compartment as the above or the payment with respect to the medical care or the like for a patient of the infectious disease in some cases, so that the settlement information on the electronic settlement may indicate an article that is brought into the vehicle compartment by the occupant D of the vehicle 20. The above-mentioned air-conditioning control unit 11B performs the control in accordance with the commodity purchased by the electronic settlement or the service having a value paid by the electronic settlement, which is included in the settlement information, with respect to the air conditioner 21, and thus can control the air conditioner 21 in accordance with the article brought into the vehicle compartment by the occupant D of the vehicle 20.

The above-mentioned electronic settlement may be performed by a connected car payment. In this case, the vehicle 20 is provided with a settlement device for the connected car payment. The air-conditioning control system 10 may acquire settlement information by communicating with the settlement device.

The air-conditioning control system 10 may communicate with the center server 50 via a data communication module (DCM) or the like, which is not illustrated, mounted to the vehicle 20. In this case, the center server 50 may acquire the above-mentioned settlement information from the settlement terminal 40 and the like, and transmit the acquired settlement information via the DCM to the air-conditioning control system 10. In this case, the occupant D may perform the electronic settlement by a credit card or the like. The center server 50 stores therein, for example, identification information, such as a credit card number necessary for the electronic settlement by the occupant D and the like, in association with an IP address of the DCM in the vehicle 20, and transmits, at the time of the electronic settlement, the above-mentioned settlement information to the DCM with the IP address in association with the identification information.

The air-conditioning control system 10 in FIG. 1 may be used as a conventional ECU that controls the air conditioner 21, and the mobile terminal 30 may be caused to operate as the air-conditioning control system 10. In this case, a processor of the mobile terminal 30 executes a program to operate as the settlement information acquisition unit 11A and the air-conditioning control unit 11B. For example, in a case where the air-conditioning control unit 11B executes the processing in FIG. 6, and controls the air conditioner 21 in the external air introduction mode and the like, the air-conditioning control unit 11B transmits an instruction therefor via the car-navigation system 24 to the ECU. In this manner, the air-conditioning control unit 11B may perform the control of the air conditioner 21 in accordance with the settlement content of the electronic settlement indicated by the settlement information, with the ECU and the like.

The air-conditioning control system 10 in FIG. 1 may be used as the ECU that controls the air conditioner 21, and the center server 50 may be caused to operate as the air-conditioning control system 10. In this case, a processor of the center server 50 executes a program to operate as the settlement information acquisition unit 11A and the air-conditioning control unit 11B. The settlement information is transmitted from the settlement terminal 40 to the center server 50. The air-conditioning control unit 11B executes, for example, the processing in FIG. 6, on the basis of settlement information from the settlement terminal 40, which is acquired by the settlement information acquisition unit 11A, and transmits, when controlling the air conditioner 21 in the external air introduction mode and the like, an instruction therefor via the above-mentioned DCM and the like to the ECU. The air-conditioning control unit 11B may perform the control of the air conditioner 21 in accordance with the settlement content of the electronic settlement indicated by the settlement information, via the DCM, the ECU, and the like.

The air-conditioning control system 10 may include a plurality of devices that allow wireless communication therewith via a network or directly.

The invention claimed is:

1. An air-conditioning control system that controls an air conditioner of a vehicle, the air-conditioning control system comprising:
    an acquisition unit that acquires settlement information on an electronic settlement performed by an occupant of the vehicle; and
    an air-conditioning control unit that controls the air conditioner on a basis of the settlement information, wherein
    the settlement information includes a commodity purchased by the electronic settlement or a service having a value paid by the electronic settlement, as a settlement target,
    the air-conditioning control unit controls the air conditioner in accordance with a control content of the air conditioner, which is stored in a storage unit by being associated with the settlement target,
    the settlement information includes a commodity that emits an odor purchased by the electronic settlement or a service with respect to an article that emits an odor having the value paid by the electronic settlement, as an odor settlement target, and
    the control content corresponding to the odor settlement target includes either one or both of a first control of causing the air conditioner to operate in an external air introduction mode, and a second control of causing air from the air conditioner to blow from, among an upper nozzle and a lower nozzle in the vehicle, the upper nozzle.

2. The air-conditioning control system according to claim 1, wherein the commodity that emits an odor includes a food or a drink.

3. The air-conditioning control system according to claim 1, wherein the commodity that emits an odor or the article that emits an odor includes an animal.

4. The air-conditioning control system according to claim 1, wherein the settlement target includes a therapeutic agent for an infectious disease purchased by the electronic settlement or a service with respect to the infectious disease having the value paid by the electronic settlement, as an infectious disease settlement target, and the control content corresponding to the infectious disease settlement target includes control of causing the air conditioner to operate in the external air introduction mode.

5. The air-conditioning control system according to claim 1, wherein the acquisition unit acquires an instruction to cause the air conditioner to operate in the external air introduction mode from a medical expert, and the air-conditioning control unit causes the air conditioner to operate in the external air introduction mode on a basis of the instruction.

6. A non-transient computer-readable storage medium that stores therein an air-conditioning control program, the air-conditioning control program causes a processor of a computer that controls an air conditioner of a vehicle to execute:

an acquisition step of acquiring settlement information on an electronic settlement performed by an occupant of the vehicle; and an air-conditioning control step of controlling the air conditioner on a basis of the settlement information, wherein the settlement information includes a commodity purchased by the electronic settlement or service having a value paid by the electronic settlement, as a settlement target, the air-conditioning control unit controls the air conditioner in accordance with a control content of the air conditioner, which is stored in a storage unit by being associated with the settlement target, the settlement information includes a commodity that emits an odor purchased by the electronic settlement or service with respect to an article that emits an odor having the value paid by the electronic settlement, as an odor settlement target, and the control content corresponding to the odor settlement target includes either one or both of a first control of causing the air conditioner to operate in an external air introduction mode, and a second control of causing air from the air conditioner to blow from, among an upper nozzle and a lower nozzle in the vehicle, the upper nozzle.

7. An air-conditioning control system that controls an air conditioner of a vehicle, the air-conditioning control system comprising:

an acquisition unit that acquires settlement information on an electronic settlement performed by an occupant of the vehicle; and an air-conditioning control unit that controls the air conditioner on a basis of the settlement information, wherein the settlement information includes a commodity purchased by the electronic settlement or service having a value paid by the electronic settlement, as a settlement target, the air-conditioning control unit controls the air conditioner in accordance with a control content of the air conditioner, which is stored in a storage unit by being associated with the settlement target, the settlement target includes a therapeutic agent for an infectious disease purchased by the electronic settlement or a service with respect to the infectious disease having the value paid by the electronic settlement, as an infectious disease settlement target, and the control content corresponding to the infectious disease settlement target includes a control of causing the air conditioner to operate in an external air introduction mode.

\* \* \* \* \*